United States Patent [19]

Runkles et al.

[11] Patent Number: 4,900,070
[45] Date of Patent: Feb. 13, 1990

[54] CONDUIT COUPLING DEVICE WITH REDUNDANCY FEATURES

[75] Inventors: Richard R. Runkles, Englewood; John A. Dyer, Westminster, both of Colo.

[73] Assignee: Stanley Aviation Corporation, Aurora, Colo.

[21] Appl. No.: 312,713

[22] Filed: Feb. 21, 1989

[51] Int. Cl.$^4$ .............................................. F16L 21/06
[52] U.S. Cl. ..................................... 285/233; 285/373
[58] Field of Search ................ 285/233, 373, 419, 317

[56] References Cited

U.S. PATENT DOCUMENTS

| | | | |
|---|---|---|---|
| 3,181,189 | 5/1965 | Leyden . | |
| 3,776,579 | 12/1973 | Gale | 285/233 |
| 3,999,825 | 12/1976 | Cannon | 285/373 X |
| 4,008,937 | 2/1977 | Filippi | 285/233 X |
| 4,150,464 | 4/1979 | Tracy . | |
| 4,249,786 | 2/1981 | Mahoff | 285/233 X |
| 4,534,090 | 8/1985 | Skobel . | |
| 4,577,377 | 3/1986 | Kasai . | |
| 4,600,220 | 7/1986 | Agnelli | 285/373 X |
| 4,631,787 | 12/1986 | Kasai . | |
| 4,639,982 | 2/1987 | Kasai . | |
| 4,662,040 | 5/1987 | Terrell et al. . | |
| 4,688,337 | 8/1987 | Dillner et al. . | |
| 4,712,280 | 12/1987 | Fildan . | |
| 4,795,197 | 1/1989 | Kaminski et al. | 285/419 X |

*Primary Examiner*—Thomas F. Callaghan
*Attorney, Agent, or Firm*—Fields, Lewis, Pittenger & Rost

[57] ABSTRACT

A coupling assembly for connecting adjacent ends of conduits, primarily used for aircraft fuel lines having redundant locking features is provided. This coupling can be manipulated with one hand and includes laterally spaced locking tines which engage raised elements for locking the coupling in secured relationship. The coupling assembly can be manipulated with one hand and has viewing ports to be sure that all parts are in place. Also, the tines and guide members are configured to create a force between the two with a longitudinal component tending to open the assembly.

6 Claims, 3 Drawing Sheets

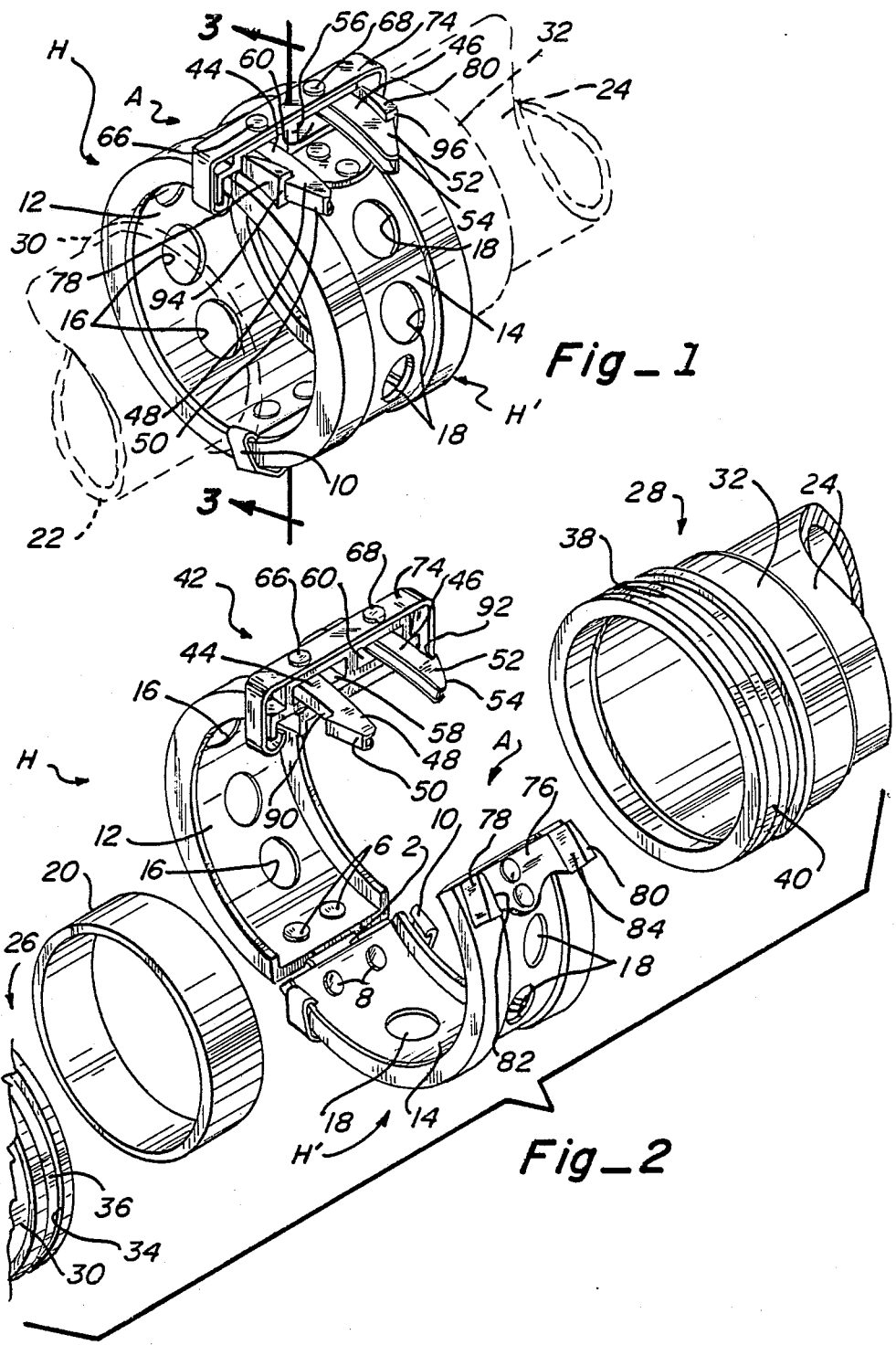

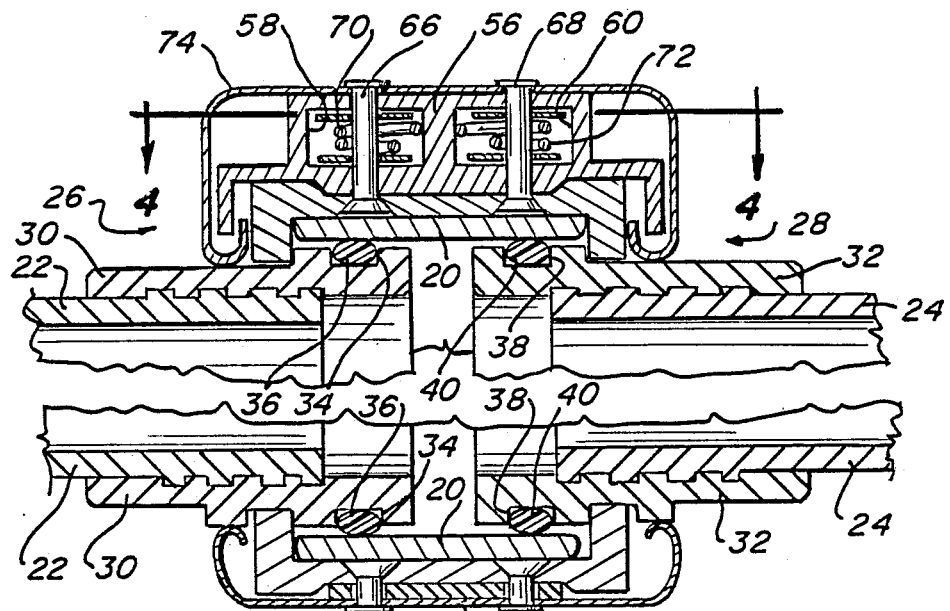
Fig_3
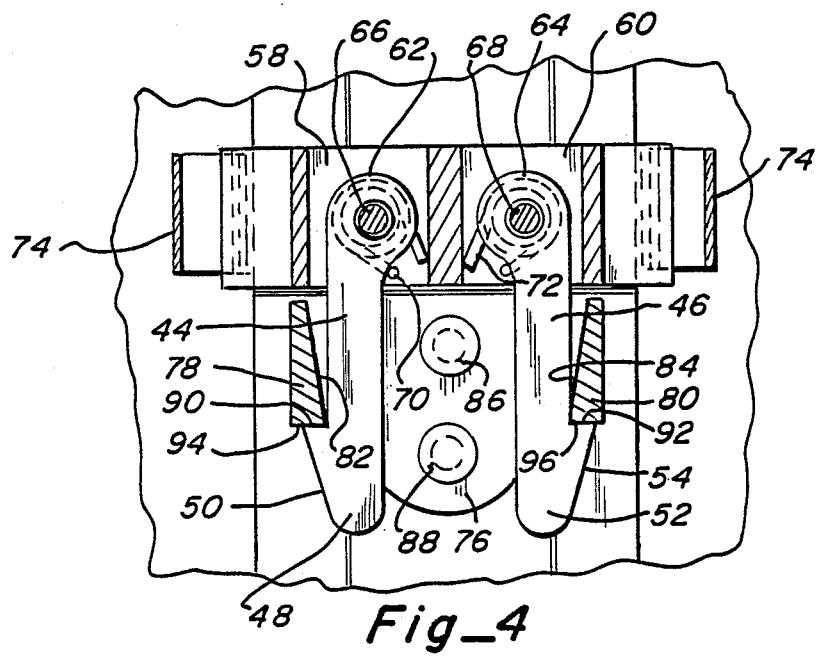
Fig_4

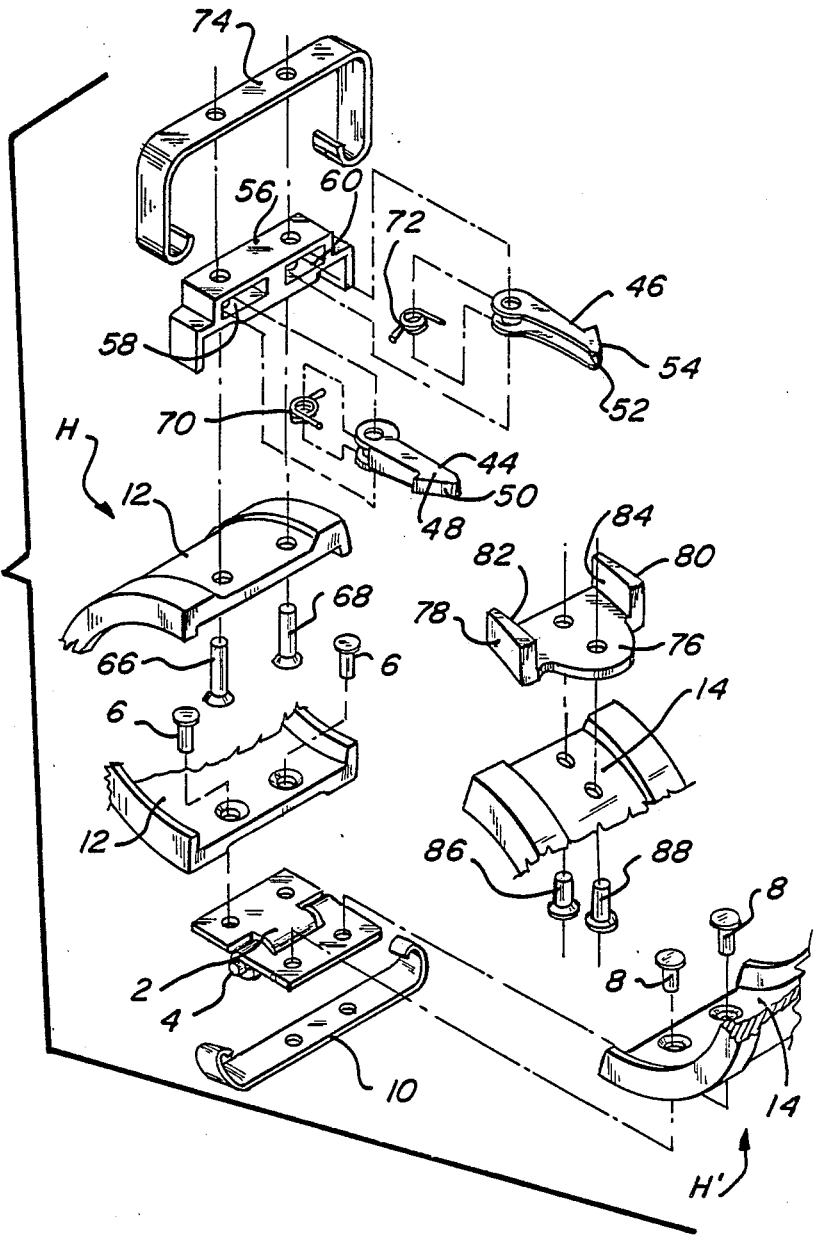

CONDUIT COUPLING DEVICE WITH REDUNDANCY FEATURES

TECHNICAL FIELD

The present invention relates to a coupling assembly, and in particular to a coupling assembly for interconnecting a pair of tubular conduit members in which the coupling assembly has a releasable locking member with redundancy features and indicia to verify whether or not the coupling assembly is completely closed. This invention is related to commonly assigned co-pending U.S. application Ser. No. 267,841 filed Nov. 7, 1988.

BACKGROUND ART

Because of the space confinements within an aircraft, coupling assemblies for interconnecting tubular conduit members are often located at places within the aircraft which are difficult to reach, to see and to service. Thus, it is desirable to have couplings which can be easily manipulated with ne hand by the mechanic for closure. In addition, it is necessary that the fastening device used on the coupling have redundancy features to minimize inadvertent opening of the coupling should a latch become damaged.

The latching or locking art is well developed. There are many examples of latching devices spaced outer tines which are resilient or bendable for moving them between a latched and unlatched position for separating and connecting the latching members. Examples of these are Leyden U.S. Pat. No. 3,181,189 which shows a latching mechanism for connecting a toothbrush shank to an electric motor. Tracy U.S. Pat. No. 4,150,464; Kasai U.S. Pat. Nos. 4,631,787 and 4,639,982; Terrell, et al. U.S. Pat. No. 4,662,040 and Fildan U.S. Pat. No. 4,712,280 each show buckles for straps wherein one of the members has a central flexible tine spaced on either side of the central tine for receipt in a suitable receiving member. Although each of these devices is satisfactory for its intended purpose, none provides an arrangement wherein the tines are as readily accessible as is desirable in an aircraft configuration.

Skobel U.S. Pat. No. 4,534,090 discloses a latching mechanism having a pair of tines with curved ends which reduces the surface in engagement with the receiving member which will lower the frictional forces on the device when it is being connected or released. However, it has none of the other features of the present invention.

Kasai U.S. Pat. No. 4,577,377 and Dillner, et al. U.S. Pat. No. 4,688,337 each disclose a female member having tapered side edges which engage the outer surfaces of the flexible tines.

DISCLOSURE OF THE INVENTION

In accordance with this invention a coupling assembly for releasably interconnecting confronting ends of first and second fluid carrying conduit members is provided. These flanges have a groove therein for receiving a sealing ring. The coupling assembly includes a sleeve circumferentially surrounding the sealing ring and the flanges of the fluid carrying conduit members. A pair of arcuate coupling halves are pivotally joined together at first adjacent ends for circumferentially surrounding the sleeve, each of the coupling halves including an arcuate circumferential wall having a pair of spaced ribs extending inwardly from opposite circumferential edges thereof. A pair of raised locking surfaces spaced inwardly from the opposite circumferential edges, respectively, on the outer surface of the opposite end of one of the coupling halves. A pair of locking tines extend longitudinally from the outer surface of the opposite end of the other of the coupling halves. The locking tines are engageable with the locking surfaces. Resilient biasing means urge the locking tines outwardly from the line of symmetry so that the locking tines snap into engagement with the respective locking surfaces to releasably hold the coupling halves in closed position around the sleeves.

The locking surface tapers inwardly and the locking tines have inwardly tapered outer surfaces adjacent the distal ends thereof which is at the same angle as the taper of the locking surfaces. A force is exerted along the area of contact which has a component tending to force the coupling halves apart. A locking lip extends outwardly from each of the locking tines at the proximate end of the outer surface and a locking edge on the proximate end of each of the locking surfaces is provided for receiving the locking lip when the locking halves are in closed position.

The resilient biasing means can include a pair of pivot pins attached to the outer surface of the other of the coupling halves, the locking tines being pivotally mounted thereon and spring means on the pivot pins for respectively urging the locking tines into locking engagement with the locking surfaces, respectively.

The geometry of the tines and locking surfaces create a component force urging the tines toward unlocked position once they are released.

Additional advantages of this invention will become apparent from the description which follows, taken in conjunction with the accompanying drawings.

BRIEF DESCRIPTION OF THE DRAWINGS

FIG. 1 is a fragmentary perspective view showing the coupling assembly of this invention connecting confronting conduit ends;

FIG. 2 is a perspective view of the coupling assembly of this invention in open position;

FIG. 3 is a fragmentary vertical section, taken along line 3—3 of FIG. 1, showing details of the hinge and tine construction;

FIG. 4 is a fragmentary horizontal section, taken along line 4—4 of FIG. 3, showing the tines in locked position; and FIG. 5 is a fragmentary, exploded view of the coupling assembly of this invention.

BEST MODE FOR CARRYING OUT THE INVENTION

In accordance with this invention, a coupling assembly A is provided which comprises a first coupling half H and a second coupling half H, having first ends pivotally joined together by a hinge 2. The hinge includes a single hinge pin 4 and has one side attached to half H by pins or rivets 6. The other side is connected to half H' by pins or rivets 8 which also attach a bonding jumper 10, as shown.

Conveniently, half H has an arcuate surface 12 and half H, has an arcuate surface 14. Arcuate surface 12 has spaced openings 16 and arcuate surface 14 has space openings 18 which have the dual purpose of reducing the weight of the coupling, without substantially reducing the strength, and of providing a viewing opening for observing whether or not coupling ring 20 is in place.

Referring to FIG. 3, the coupling assembly A interconnects a pair of fluid carrying tubes or conduits 22 and 24. Sealing flanges 26 and 28 are connected to conduits 22 and 24 by means of skirts 30 and 32 respectively. As best seen in FIG. 3, sealing flange 26 is provided with a recess 34 for receiving a sealing ring 36 which bears against coupling ring 20 to form a seal. Similarly, sealing flange 28 is provided with a recess 38 for receiving a sealing ring 40 which bears against coupling ring 20.

The ends of coupling halves H and H, opposite the hinge have cooperating latch means. The latch means for coupling half H includes a male locking member 42 having laterally spaced locking tines 44 and 46 on opposite sides thereof. These locking tines are identical but reversed in shape and each has a narrow arm which extends parallel to but spaced from the other. Locking tine 44 has an enlarged head or distal end 48. The end has a tapered edge 50 for pressing the tine inwardly for releasing the latch mechanism, as will be described more fully below. The opposite locking tine 46 includes an enlarged distal end 52 having a tapered edge 54, also to assist in releasing the locking means.

A generally rectangular housing 56 is provided which has laterally spaced rectangular openings 58 and 60 for receiving the proximate ends 62 and 64 of tines 44 and 46, respectively. Vertical posts 66 and 68 extend through an opening in ends 66 and 64 respectively for mounting the tine for pivotal movement. The tines are normally urged outwardly by coil springs 70 and 72 which extend around posts 66 and 68, respectively, and are positioned within openings 58 and 60 respectively. Conveniently, posts 66 and 68 also hold bonding jumper 74 in place on the top of housing 56, as shown.

The end of coupling half H' opposite the hinge has a mounting 76 which includes a pair of spaced raised guide members or elements 78 and 80. Conveniently, these elements each have internal angled guide surfaces 82 and 84, respectively for engaging the tapered edges 50 and 54 of tines 44 and 46, respectively, when the coupling is closed. Mounting 76 is attached to surface 14 by means of pins 86 and 88.

As the locking mechanism is closed, outer angled surfaces 50 and 54 of tines 48 and 52, respectively, will engage inwardly canted or tapered cam surfaces 82 and 84 of mounting 76. As the locking mechanism continues to be closed, the locking tines 48 and 52 will be pivoted inwardly about posts 66 and 68, respectively, as surface 50 slides passed surface 82 and surface 54 slides passed surface 84. When the locking tines reached the position shown in FIG. 4, they spring outwardly under the influence of springs 70 and 72, respectively. As the locking tines spring outwardly, locking lips 90 and 92 lock behind a locking edge 94 and 96, respectively, on the ends of guide members 82 and 84, respectively.

To release the coupling, the operator need merely squeeze in on the angled edges 50 and 54 of locking tines 48 and 52, respectively. Conveniently, the rotational force exerted on the tines by their respective springs, will create a force in the releasing direction between surfaces 50 and 82 and surfaces 54 and 84, respectively. This assists in releasing the tines when they are squeezed inwardly. Conversely, when the clamp is squeezed together into the locking position, this force must be overcome by the operator and the two coupling halves squeezed together until the tines latch in place, as previously described.

From the foregoing, it is apparent that a coupling assembly has been provided for use on an aircraft which is lightweight, easy to use, and has redundant tines for assuring that should one of them become broken or damaged that the device will not easily separate. Because of the indicia provided the coupling assembly can be easily examined to be sure that it is in closed position. When released the geometry is such that the coupling tends to move toward the unlocked position to assure that the indicia will be exposed.

This invention has been described in detail with reference to a particular embodiment thereof, but it will be understood that various other modifications can be effected within the spirit and scope of this invention.

We claim:

1. A coupling assembly for releasably interconnecting confronting ends of first and second fluid carrying conduit members wherein a pair of annular flanges are fixedly attached to each of the confronting ends, each flange having an outside shoulder and an inside shoulder spaced from the outside shoulder to define a groove therebetween and a sealing ring positioned in each of the flange grooves, said assembly comprising:

a sleeve for circumferentially surrounding the sealing rings and the flanges;

a pair of symmetrical arcuate coupling halves pivotally joined together at first adjacent ends for circumferentially surrounding said sleeve, each of said coupling halves including an arcuate circumferential wall having a pair of spaced ribs extending inwardly from opposite circumferential edges thereof adapted to engage the outside shoulders;

a pair of raised locking surfaces each spaced inwardly from said opposite circumferential edges, respectfully, located on and extending generally longitudinally of the outer surface of the opposite end of one of said halves;

a pair of locking tines extending longitudinally from the outer surface of the opposite end of said other of said coupling halves, said locking tines being engageable with said locking surfaces; and resilient biasing means urging said locking tines laterally outwardly so that said locking tines snap into engagement with said respective locking surfaces to releasably hold said coupling halves in closed position around said sleeve.

2. Apparatus, as claimed in claim 1, wherein:

said locking surfaces taper inwardly, toward the center of said one of said halves in the direction of closures; and said locking tines having inwardly tapered outer surfaces adjacent the distal ends thereof which are brought into sliding engagement and line contact with said locking surfaces when said halves are closed so that said locking tines are moved inwardly against the force of said biasing means.

3. Apparatus, as claimed in claim 2, wherein:

a force is exerted along said line contact which has a component tending to force said coupling halves apart.

4. Apparatus, as claimed in claim 2, further including:

a locking lip extending outwardly from each of said locking tines at the proximate end of said outer surface; and a locking edge on the proximate end of each of said locking surfaces for receiving said locking lip when said coupling halves are in closed position.

5. Apparatus, as claimed in claim 1, wherein said resilient biasing means includes:
- a pair of pivot pins attached to and projecting from said outer surface of said other of said coupling halves, said locking tines being pivotally mounted thereon; and
- spring means on said pivot pins for respectively urging said locking tines into locking engagement with said locking surfaces, respectively.

6. Apparatus, as claimed in claim 1, wherein:
said locking tines each have tapered outer surface engageable with said raised locking surfaces so that a force in the unlocking direction is created between the outer surfaces of said locking tines and said raised locking surfaces.

* * * * *